(12) United States Patent
Ropp

(10) Patent No.: US 6,264,180 B1
(45) Date of Patent: Jul. 24, 2001

(54) AXIALLY ADJUSTABLE ROLLER ASSEMBLY

(75) Inventor: Dale Ropp, Buda, IL (US)

(73) Assignee: Sears Manufacturing Co., Davenport, IA (US)

( * ) Notice: Subject to any disclaimer, the term of this patent is extended or adjusted under 35 U.S.C. 154(b) by 0 days.

(21) Appl. No.: 09/321,286

(22) Filed: May 27, 1999

(51) Int. Cl.⁷ .................................. A47C 7/14; F16F 1/00
(52) U.S. Cl. ............................ 267/131; 384/57; 248/157
(58) Field of Search ..................... 248/429, 430, 248/157; 384/57, 58, 127, 449, 543, 569; 267/131, 132, 133; 108/144.11–147

(56) References Cited

U.S. PATENT DOCUMENTS

| 2,766,007 | * | 10/1956 | Krilanovich | 248/157 |
| 3,265,450 | * | 8/1966 | Aho | 384/57 |
| 3,743,229 | * | 7/1973 | Breitschwerdt et al. | 248/429 |
| 4,747,353 | * | 5/1988 | Watt | 248/157 |
| 4,914,712 | * | 4/1990 | Ikimi et al. | 384/449 |
| 5,118,062 | * | 6/1992 | Archambault | 248/430 |
| 5,348,261 | * | 9/1994 | Nini | 248/430 |
| 5,765,802 | * | 6/1998 | bostrom et al. | 248/429 |
| 5,871,198 | * | 2/1999 | Bostrom et al. | 248/275 |

* cited by examiner

Primary Examiner—Robert J. Oberleitner
Assistant Examiner—Robert A. Siconolfi
(74) Attorney, Agent, or Firm—Niro, Savone, Haller & Niro

(57) ABSTRACT

An improved seat suspension assembly with axially adjustable roller and guide assemblies. The suspension uses an adjustment member the actuation of which causes the axial movement of either the roller or guide so as to adjust the spatial relationship between the roller and guide.

19 Claims, 5 Drawing Sheets

US 6,264,180 B1

AXIALLY ADJUSTABLE ROLLER ASSEMBLY

BACKGROUND OF THE INVENTION

The invention relates to an improved seat suspension system using a unique roller and channel or guide assembly as part of the suspension system. Typically, seat suspensions use roller assemblies mounted to shafts and adapted to cycle back and forth in metal channels or guides. The roller assemblies are often associated with a scissor arm which, in turn, operates in conjunction with a spring and shock absorber to increase the comfort of the occupant in the seat.

However, due to the difficulty and/or costliness of maintaining manufacturing tolerances or through use and associated wear, the optimal positioning or tolerance between the roller assemblies and their respective guides is often difficult to achieve and maintain. In operation of the seat suspension, a precise tolerance between the two components is desired since unwanted play produces axially movement that accelerates wear and causes potential discomfort to the occupant.

SUMMARY OF THE INVENTION

The present invention provides an axially adjustable roller and guide assembly which allows the optimal position between the two components to be achieved and maintained, and thus, eliminates or minimizes any undesired axial movement. The present invention incorporates on a seat suspension a positionable adjustment member that reduces unwanted play by axially adjusting the spatial distance between the roller and its respective guide by urging one of the two components axially with respect to the other component. The adjustment member may be located in a number of different positions and it is used to achieve a precise tolerance between the two components.

It is, therefore, an object of the present invention to provide a seat suspension assembly in which the axial alignment of a roller with respect to a guide may be adjusted after manufacture in order to place the roller in an optimal position with respect to the guide prior to or during use in order to reduce or eliminate unwanted axial movement or play in the seat.

Another object of the present invention is to provide a seat suspension assembly in which the axial alignment of a roller with respect to a guide may be adjusted after prolonged use of the device in order to maintain and/or reposition the roller in an optimal position with respect to the guide in order to reduce or eliminate unwanted axial movement.

It is another object of the present invention to provide an adjustment member that urges a roller axially with respect to a guide in order to maintain an optimal spatial relationship between the roller and guide.

A further object of the present invention is to provide an adjustment member that urges a guide axially with respect to a roller in order to maintain an optimal spatial relationship between the roller and guide.

BRIEF DESCRIPTION OF THE DRAWINGS

The novel features which are characteristic of the present invention are set forth in the appended claims. However, the invention's preferred embodiments, together with further objects and attendant advantages, will be best understood by reference to the following detailed description taken in connection with the accompanying drawings in which:

DETAILED DESCRIPTION OF THE PREFERRED EMBODIMENTS

Set forth below is a description of what are currently believed to be the preferred embodiments or best examples of the invention claimed. Future and present alternatives and modifications to the preferred embodiments are contemplated. Any insubstantial changes or modifications in function, purpose, structure or result are intended to be covered by the claims of this patent.

Figure 1:
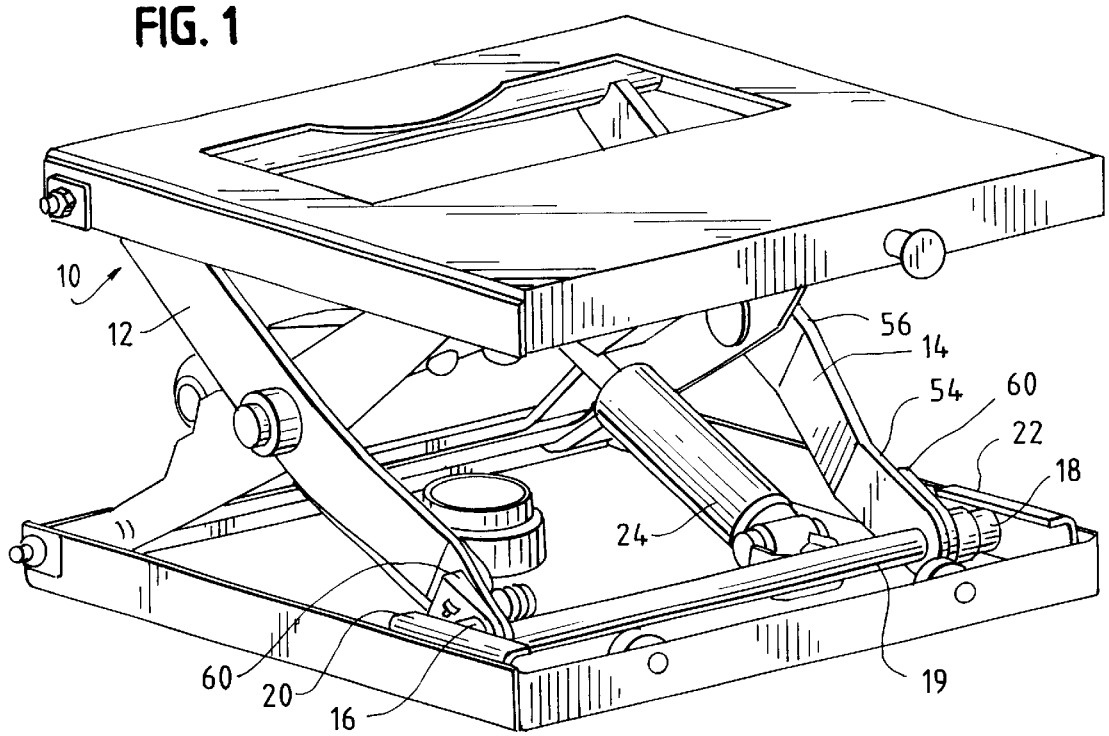
FIG. 1 is a perspective view of a typical seat suspension using one embodiment of the present invention.
Figure 2:
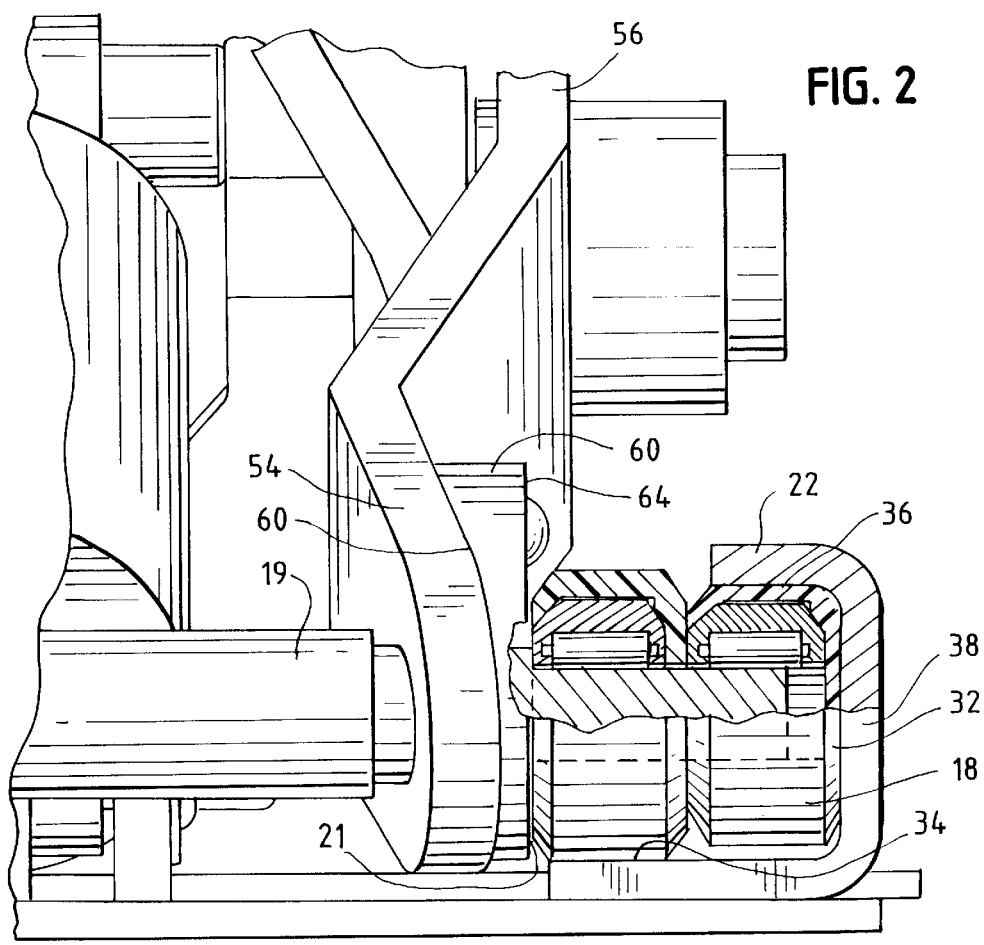
FIG. 2 is an enlarged partial front view of the embodiment shown in FIG. 1 with portions removed to reveal aspects of the present invention.

As shown in FIG. 1, the present invention may be used in seat suspensions 10 having parallel pairs of scissor arms 12 and 14 which are in turn connected to a shock absorber 24. The scissor arms are also attached to opposingly located rollers 16 and 18 which travel in channels or guides 20 and 22. Typical examples of some of the different types of mechanical seat suspensions in which the present invention may be used are shown and described in U.S. Pat. Nos. 4,856,763 and 5,125,631, which are incorporated herein by reference. Of course, the present invention is not limited to use in scissor-type seat suspensions but also may be used in other types of seat suspensions in which rollers and guides are used as part of the suspension system. One type of roller that may be used with the present invention is of the design described and shown in U.S. Pat. No. 5,468,070, which is incorporated herein by reference.

Figure 3:
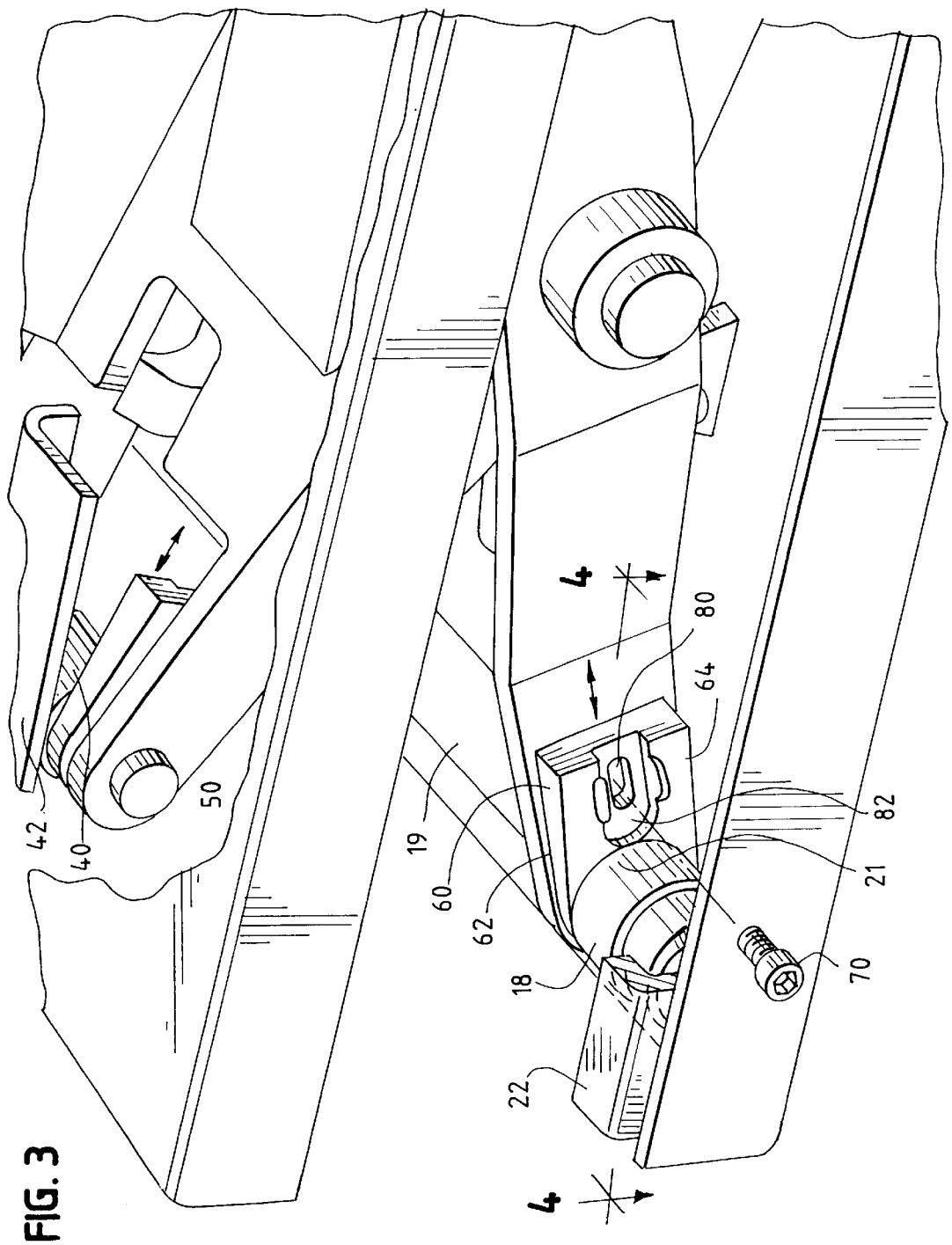
FIG. 3 is a perspective view of the embodiment shown in FIG. 1, again, with portions removed to reveal aspects of the present invention.

Roller assembly 18 (here illustrated as a double roller) is affixed to shaft 19 which is part of the seat suspension. Roller assembly 18 has a side wall 32 and is positioned on guide 22 which has opposing guide surfaces 34 and 36. Guide 22 also has a side wall 38 which engages or is positioned in close proximity to side wall 32 of roller 18. As is also shown in FIG. 3, the same design and construction may also be used for all other rollers and guides used in the suspension such as rollers 16 and 40 and guides 20 and 42.

To maintain a desired clearance between the side walls of the roller assembly and guide or a desired predetermined spatial relationship between the roller assembly and guide, the present invention employs an adjustment member 60. In one preferred embodiment, adjustment member 60 may be located on an angled portion 54 of arm 56 and is disposed between arm 56 and roller 18. Adjustment member 60 has an angled surface 62 which slidingly engages angled arm portion 54 of arm 56. In addition, the angle of surface 62 is the same as the angle of arm portion 54 so that surface 64 of adjustment member 60 remains parallel to the surface 21 of roller 18 or perpendicular to shaft 19 during the sliding engagement between member 60 and arm 56.

Using an angled surface on adjustment member 60 provides a variation in distance between surfaces 62 and 64 which allows the position of roller 18 with respect to guide wall 38 to be adjusted by slidingly positioning adjustment member 60 on arm 56. Providing an adjustment member with a graduation in transverse dimension along its length permits the roller to be positioned in a plurality of adjustment positions.

One preferred shape that may be used for an adjustment member is a wedge-shaped structure such as is shown. This configuration provides a useful graduation in transverse dimension that permits fine positioning adjustments to be made. Of course, other shapes using variations in transverse dimension may be used as well and such shapes would be known to those of skill in the art and covered by the claims of the present invention.

In addition, to permit adjustment member 60 to move about shaft 19, it may include an elongated aperture (not shown) through which shaft 19 extends. Alternatively, member 60 may include two leg portions (not shown) which extend on opposing sides of shaft 19.

Figure 4:
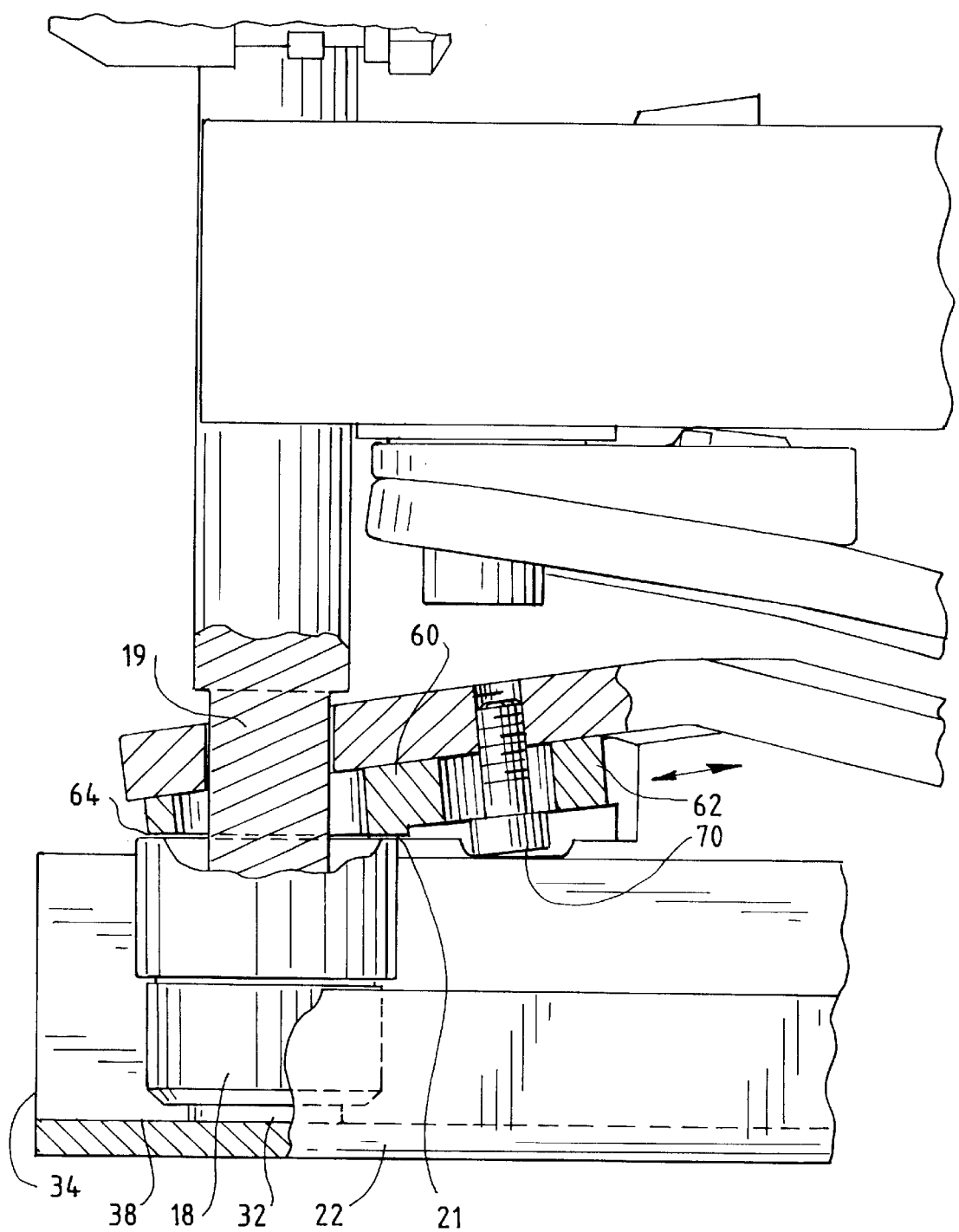
FIG. 4 is partial cross-sectional view of the embodiment shown in FIG. 3 taken along line 4—4.

As shown in FIGS. 3 and 4, fastener 70 may be used to fix the position of adjustment member 60 on arm 56. Fastener 70 extends through elongated bore 80 and into coacting threads in arm 56 (not shown). In addition, the fastener head may be disposed within recess 82 to minimize interference with the operation of the suspension.

Figure 5:
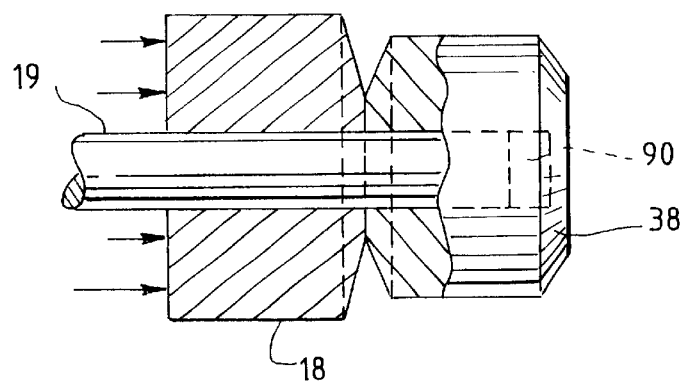
FIG. 5 is a fragmentary cross-sectional view of a roller assembly with a shaft disposed therein.

As shown in FIG. 5, shaft 19 is disposed inside roller 18 and terminates at a point that is spaced from the vertical wall 32 to form space or gap 90. Space 90 permits adjustment of the roller without interference from shaft 19.

Figure 6:
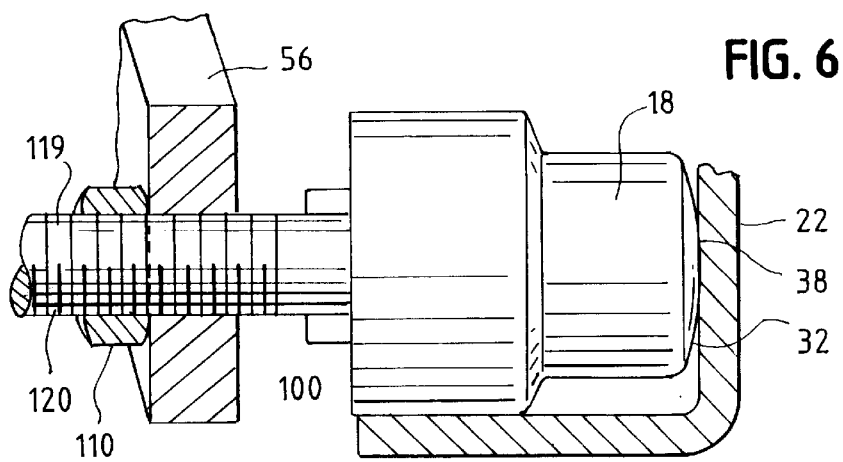
FIG. 6 is a partial cross-sectional view illustrating a second embodiment of the present invention.

In an alternate embodiment, adjustment member 119 may be an axially positionable shaft that employs coacting threads to adjust the position of the roller with respect to the guide. As shown in FIG. 6, roller 18 is axially adjusted by coacting threaded members 110 and 120 the rotation of which changes the axial position of the shaft and attached stop 110, and in turn, urges roller 18 towards or away from side wall 38.

In yet another alternate embodiment, the adjustment member may be comprised of an articulating lever 130 having opposing ends 131 and 133. End 131 engages a fastener 132 and end 133 causes the axial movement of roller 18. As lever 130 pivots about fulcrum or pivot point 134 through the use of fastener 132, end 133 urges roller 18 to either move axially toward or away from guide wall 38—thus adjusting the roller's position with respect to the guide.

Figure 8:
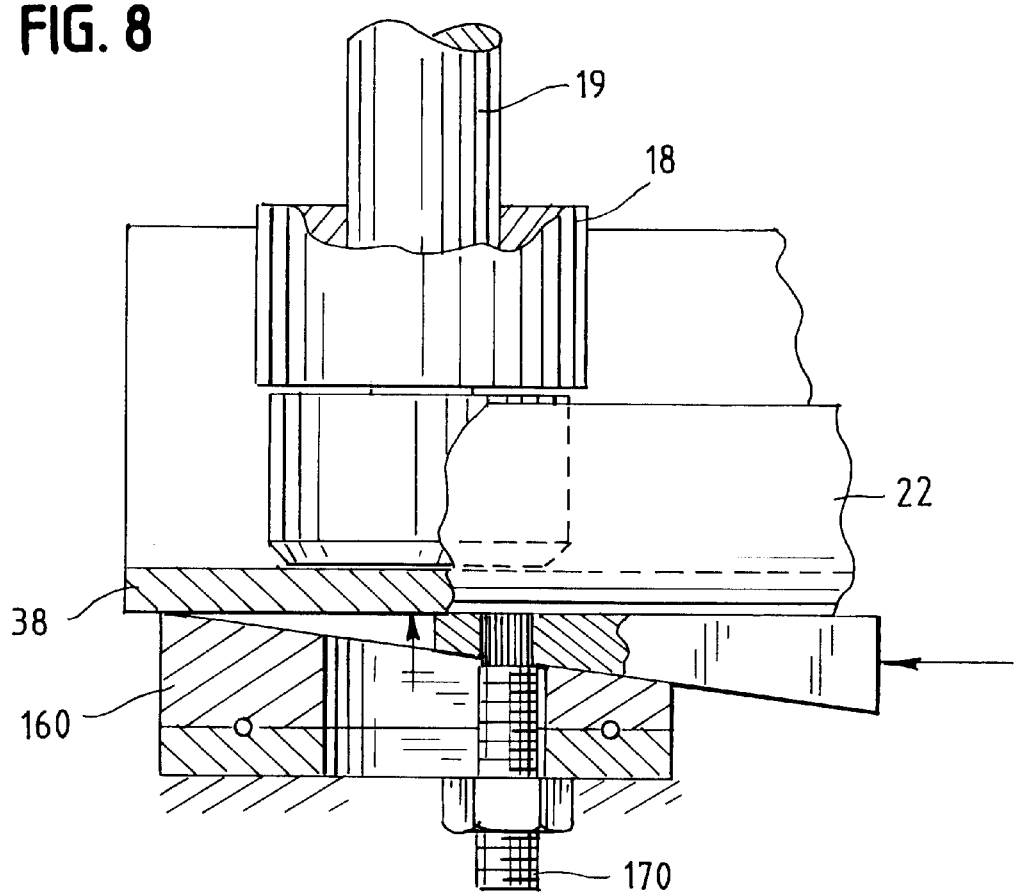
FIG. 8 shows another partial cross-sectional view illustrating a fourth embodiment of the present invention.
Figure 9:
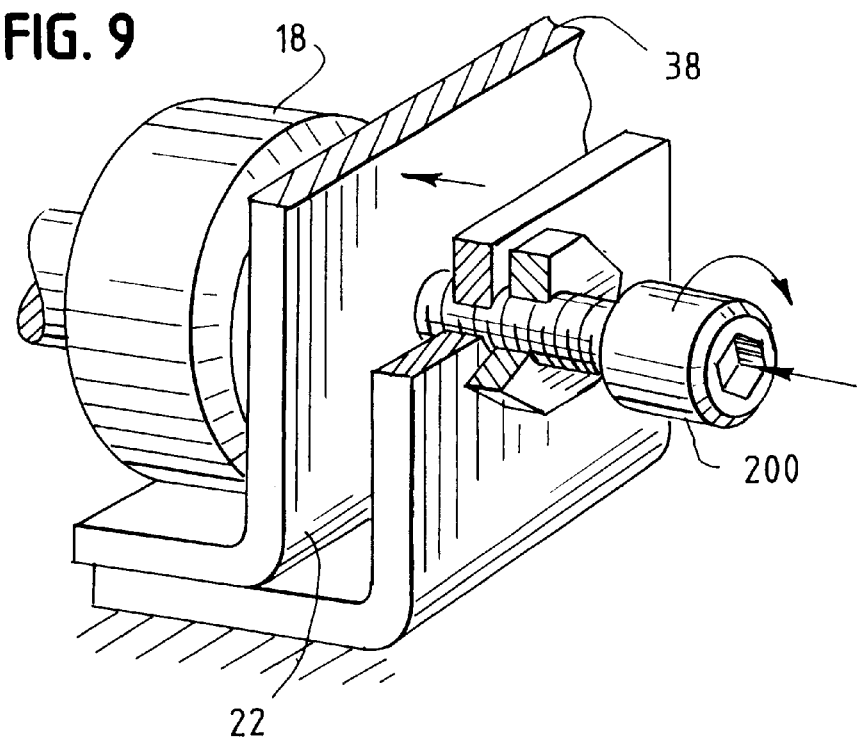
FIG. 9 is a perspective view illustrating a fifth embodiment of the present invention.

As shown in FIGS. 8 and 9, the adjustment member may also act upon the guide as well. In yet another embodiment and as shown in FIG. 8, a positionable adjustment member 160, similar in design and function to adjustment member 60, is used to axially position the guide with respect to roller 18. Alternatively, a fastener 200 may also be used to axially adjust the position of the guide either toward or away from the roller as shown in FIG. 9.

The present invention may be used at the time the suspension is manufactured or assembled or after a period of prolonged use to account for any loss in the tolerance or distance between the side wall of the roller and the side wall of the guide. Since opposingly located rollers are often used in seat suspensions, any excess distance or play between the side walls of the roller and guide will result in needless axial movement of the seat. To eliminate this play, the adjustment member of the present invention may be used in combination with each roller and guide assembly on a suspension.

Figure 7:
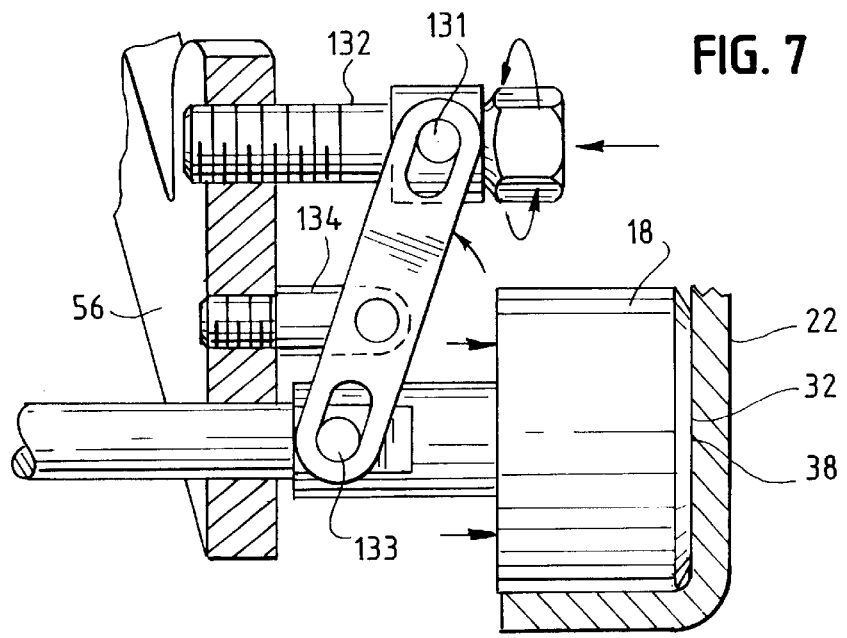
FIG. 7 shows another cross-sectional view illustrating a third embodiment of the present invention.

More specifically, in the embodiments shown in FIGS. 1–4 and 8, increasing or decreasing the amount of transverse distance used by the adjustment member acts to create axial movement which adjusts the positions of the roller with respect to the guide. In the embodiments shown in FIGS. 6, 7 and 9, rotating the threaded fastener or adjustment member also creates axial movement which adjusts the position of the roller with respect to the guide.

It should be understood that various changes and modifications to the preferred embodiment described would be apparent to those skilled in the art. Changes and modifications can be made without departing from the spirit and scope of the present invention and without diminishing its intended advantages. It is, therefore, intended that such changes and modifications be covered by the following claims.

What is claimed is:

1. A seat suspension having an axially adjustable roller comprising:

a damper;

a support arm connected to said seat suspension, said arm connected to an outwardly extending shaft;

a roller axially aligned on said shaft and in engagement with a guide on which said roller travels; and a positionable adjustment member, said adjustment member disposed between said arm and said roller whereby the positioning of said adjustment member permits the axial distance between said roller with respect to said guide to be adjusted.

2. The device of claim 1 wherein said adjustment member has a surface which remains in perpendicular alignment with the shaft as said adjustment member is positioned.

3. The device of claim 1 wherein said adjustment member has a surface directed inwardly towards said arm and a surface directed outwardly towards said roller, said outwardly directed surface remains in perpendicular alignment with the shaft as said adjustment member is positioned on said arm.

4. The device of claim 1 wherein said arm is angled with respect to said shaft.

5. The device of claim 4 wherein said angle of said arm is equal to the angle of a surface on said adjustment member.

6. The device of claim 1 wherein the distal end of said shaft is slidingly positionable in an interior aperture defined by said roller.

7. The device of claim 1 wherein said adjustment member is slidingly attached to said arm.

8. The device of claim 7 wherein said adjustment member is slidingly attached to said arm by a fastener.

9. The device of claim 1 wherein said adjustment member includes two leg portions through which said shaft extends.

10. The device of claim 1 wherein said adjustment member abuts against said roller.

11. The device of claim 1 wherein said adjustment member is a positionable shaft to which the roller is attached.

12. The device of claim 1 wherein said adjustment member is in the shape of a wedge.

13. A seat suspension system for maintaining the spatial position between a roller and guide comprising:

a damper;

a support arm connected to said seat suspension, said arm connected to an outwardly extending shaft;

a roller axially aligned on said shaft, said roller positioned in a predetermined spatial position with respect to a guide on which said roller travels; and a positionable adjustment member, said positioning of said adjustment member permits the axial distance between said roller with respect to said guide to be adjusted.

14. The device of claim 13 wherein said adjustment member is disposed between said arm and said roller.

15. The device of claim 13 wherein said adjustment member includes at least one threaded element the rotation of which adjusts the axial position of said guide with respect to said roller.

16. The device of claim 13 wherein said adjustment member abuts said guide and which adjusts the axial position of said guide with respect to said roller.

17. A seat suspension having an axially adjustable roller assembly comprising:

a support arm connected to said seat suspension, said arm connected to an outwardly extending shaft;

a roller axially aligned on said shaft and in engagement with a guide on which said roller travels; and an articulating lever disposed between said arm and said roller whereby articulation of said lever permits the axial distance between said roller and said arm to be adjusted.

18. A seat suspension having an axially adjustable roller assembly comprising:

a damper;

a support arm connected to said seat suspension, said arm connected to an outwardly extending positionable shaft;

a roller axially aligned on said shaft and in engagement with a guide on which said roller travels; and said positioning of said shaft permits the axial distance between said roller and said arm to be adjusted.

19. The device of claim 18 wherein said positionable shaft includes at least one threaded portion, the rotation of which causes the axial distance between said roller and said arm to be adjusted.

* * * * *